United States Patent
Kessler et al.

[11] 3,768,013
[45] Oct. 23, 1973

[54] NON-LINEAR FUNCTION GENERATOR

[75] Inventors: George W. Kessler, Schenectady, N.Y.; Jerry L. Stratton, Canon City, Colo.

[73] Assignee: General Electric Company, Schenectady, N.Y.

[22] Filed: Feb. 11, 1971

[21] Appl. No.: 114,547

[52] U.S. Cl.................. 324/132, 235/197, 328/142
[51] Int. Cl......................... G01r 15/10, G06g 7/12
[58] Field of Search..................... 324/132; 328/142, 328/143, 144, 145; 307/229; 235/197

[56] References Cited
UNITED STATES PATENTS
| | | | |
|---|---|---|---|
| 3,173,024 | 3/1965 | Peretz............................. | 328/142 X |
| 3,523,195 | 8/1970 | Thomas et al. ..................... | 307/229 |
| 3,532,984 | 10/1970 | Wise................................... | 324/132 |
| 3,584,232 | 6/1971 | Wallace, Jr..................... | 328/145 X |

Primary Examiner—Rudolph V. Rolinec
Assistant Examiner—Ernest F. Karlsen
Attorney—William C. Crutcher, James W. Mitchell, Frank L. Neuhauser, Oscar B. Waddell and Joseph B. Forman

[57] ABSTRACT

A circuit for producing a non-linear output signal in response to a linear input signal which may be used, for example, to increase the sensitivity of a meter or other modulating circuit to a particular range or ranges of a linear input signal. The circuit includes two current paths feeding the load or meter circuit. The first current path carries a current inversely proportional to the input signal, and the magnitude of the load or meter current carried by the second current path is determined by a control circuit responsive to the input signal.

8 Claims, 3 Drawing Figures

PATENTED OCT 23 1973 3,768,013

INVENTORS:
GEORGE W. KESSLER,
JERRY L. STRATTON,

BY *W. C. Crutcher*
THEIR ATTORNEY.

NON-LINEAR FUNCTION GENERATOR

BACKGROUND OF THE INVENTION

1. Field of the Invention

This invention relates to a non-linear function generator. More particularly, this invention relates to a non-linear function generator in which the rate of change of the output voltage between predetermined points varies in response to a linearly varying input signal.

Non-linear function generators are widely used in modern control systems wherein it is desired to linearize a process variable which is not related to an input control signal by a first order equation. For example, in steam turbines, steam flow and pressure drop in steam valves is generally very non-linear with respect to valve opening or stem lift. More particularly, the incremental change in steam flow per increment of valve travel at more throttled valve positions is much greater than the incremental steam flow per increment of valve travel at more wide-open valve positions. Thus, it may be desirable to have a non-linear function generator which in response to a linear varying input signal produces an output signal which provides a slower rate of opening of the valve at the more throttled positions and/or a more rapid rate of opening at the wide-open positions of the valve in order to linearize the rate of steam flow with respect to the input variable. However, even where it may not be necessary or desirable to linearize the rate of steam flow with respect to the steam valve control voltage, it may be desirable to accurately monitor valve openings at very small valve openings. For example, for chest warming operations, a valve stroke of approximately one-sixteenth of an inch may be required out of a total possible valve stroke of approximately 7 inches. On a linear scale proportional to 7 inches, this one-sixteenth of an inch valve stroke would be nearly impossible to read. However, not only should the operator supervising the chest warming operation be able to read the one-sixteenth inch of valve stroke, he should be able to subdivide it into the actual requirements of the chest warming operation. This invention solves this problem by providing a non-linear function generator which produces a signal having rates of change which vary in response to a linear control signal indicative of the amount of valve opening so that a meter connected to the output of the non-linear function generator will respond with different sensitivities depending upon the level of the input control voltage.

2. Description of the Prior Art

There are many types of function generators commercially available, some are sophisticated devices with exotic transistorized feedback networks that are capable of producing a desired curve within a fraction of a percent. Such devices are usually quite expensive and are not necessarily suitable for use in all applications. Heretofore there have also been provided function generators using an amplifier having diode feedback circuits that produce a segmented type output signal by having each diode biased to be non-conductive above or below a given signal level.

SUMMARY OF THE INVENTION

The invention comprises a non-linear function generator which may be used in conjuction with a meter in order to produce a metering circuit whose sensitivity varies over different ranges of a linearly varying input signal. Briefly, in accordance with the invention, there is provided a pair of circuit paths each having one end connected to one terminal of a meter or load. The other terminal of the meter or load is connected to a supply voltage. A linearly varying input signal is applied to the other end of the first of these circuit paths in order to cause the current signal through the meter to vary proportionally in response to the difference signal created between the input control voltage and the supply voltage. The linearly varying input signal is also applied to a differential amplifier or comparator circuit which produces an output voltage when the linearly varying input voltage exceeds a predetermined level. This voltage signal is applied to a point in the second circuit path, which has its other end connected to ground, to affect the flow of current through the second current path to ground. The differential amplifier or comparator circuit is provided with a feedback path which becomes effective when the output of the differential amplifier or comparator circuit exceeds a predetermined level.

BRIEF DESCRIPTION OF THE DRAWINGS

While the specification concludes with claims particularly pointing out and distinctly claiming the subject matter of the invention, it is believed that the invention will be better understood from the following description taken in connection with the accompanying drawings in which:

DESCRIPTION OF THE PREFERRED EMBODIMENTS

Figure 1:
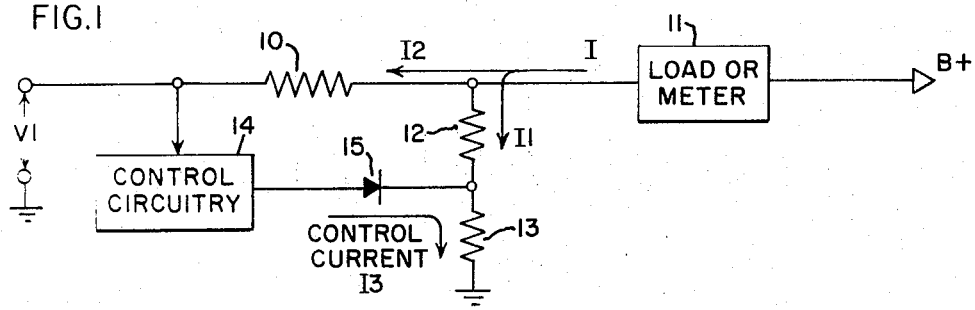
FIG. 1 is a simplified partial block diagram and partial schematic diagram of the broad concept involved in the invention.

Referring now, more particularly, to FIG. 1 to illustrate the principles of the invention, there is shown a simplified drawing partially in block diagram and partially in schematic form. A linearly varying input signal V1 is applied through resistor 10 to a load or meter 11 which is in turn connected to a positive supply voltage B+. The load or meter current I flowing through the load or meter 11 from the positive supply voltage B+ divides with a first portion, current I2, flowing through resistor 10 and a second portion, current I1, flowing through resistors 12 and 13 to ground. The input signal V1 is also applied to control circuit 14. Upon the input signal V1 reaching a predetermined level, the control circuit 14 produces a control current I3 which flows through diode 15 and resistor 13 to ground. The voltage developed across resistor 13 due to control current I3 causes a rise in potential at the junction of resistors 13 and 12 with respect to a ground reference point. This rise in potential causes a reduction in the amount of current I1 flowing through this branch and therefore also a reduction in the amount of current I drawn through the load or meter 11. The control current I3 produced by control circuit 14 may also vary as the input signal V1 reaches various predetermined levels.

Figure 2:
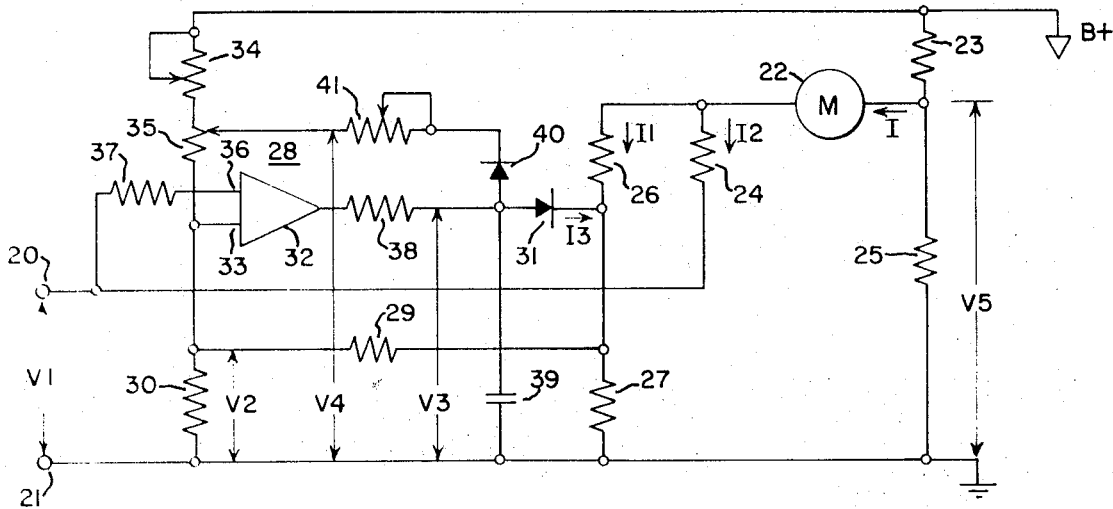
FIG. 2 is a schematic diagram of an illustrative embodiment of the invention.
Figure 3:
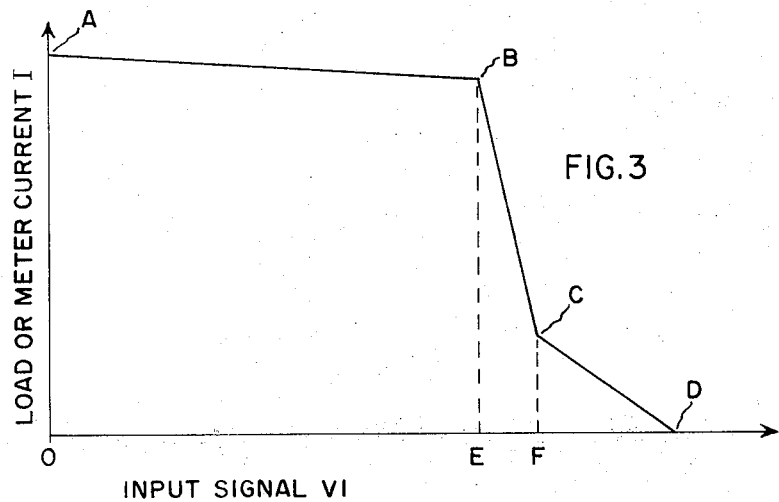
FIG. 3 is a graph of meter current of the apparatus of FIG. 2 for a linearly increasing input voltage.

Referring now to FIG. 2, there is shown a schematic diagram of an illustrative embodiment of the invention in which a linearly varying input signal V1 applied across input terminals 20 and 21 produces a non-linear current through meter 22 as shown in FIG. 3. Meter 22 is connected in series with resistors 23 and 24 between the positive supply voltage B+ and terminal 20 to which the linearly varying input signal V1 is applied. Resistor 23 in conjunction with resistor 25 forms a voltage divider network between the positive supply voltage B+ and the ground reference point. The meter 22 has one of its terminals connected to the junction of resistors 23 and 25 and the second of its terminals connected to the junction of resistors 24 and 26. Thus the current I flowing through meter 22 is divided with a first portion, current I2, flowing through resistor 24 to input terminal 20 and a second portion, current I1, flowing through resistors 26, and 27 in parallel with resistors 29 and 30 to ground. A control current I3 is caused to flow through resistors 27, and 29 and 30 in parallel therewith to ground when the input signal voltage V1 exceeds a predetermined voltage level V2 determined by current flow through the resistor 30. The control current I3 is generated in a differential amplifier 28, and is fed into resistors 27, 29, and 30 through a diode 31. The differential amplifier or comparator circuit 28 comprises an operational amplifier 32. One of the input terminals 33 receives an adjustable bias input from a biasing network composed of rheostat 34, potentiometer 35, and resistors 30, 29, and 27 which are connected between the positive supply voltage B+ and ground. A second input 36 of operational amplifier 32 is supplied with the linearly varying input signal through resistor 37 from input terminal 20. The output of the operational amplifier 32 is fed through resistor 38 to the junction of capacitor 39 connected between resistor 38 and ground, diode 31, and a feedback path comprising diode 40, rheostat 41 and potentiometer 35.

In operation, a meter current I composed of component current I1 flowing through resistor 26 and component current I2 flowing through resistor 24 flows through meter 22 when input signal voltage V1 is equal to zero. The meter current when the input signal V1 equals zero is shown as point A in FIG. 3. As the input signal V1 becomes more positive, increasing linearly, the meter current I decreases linearly along the line AB shown in FIG. 3 due to a decrease in component current I2 because of a smaller potential difference across resistor 24.

When input signal V1 exceeds the voltage V2 developed across resistor 30, differential amplifier or comparator circuit 28 is turned on producing a positive going output signal. This positive going output signal charges capacitor 39 and causes a current I3 to flow through diode 31 and resistor 27, in parallel with resistors 29 and 30. This control current I3 causes an increase in potential at the junction between resistors 26 and 27 with respect to ground, thereby reducing the potential difference across resistor 26 and therefore reducing the magnitude of the current I1 flowing through resistor 26. The meter current I flowing through meter 22 during this period of time when the input signal V1 is between voltages E and F is shown as the line BC in FIG. 3. The slope or rate of change of the output or meter current I between points B and C is largely determined by the gain of operational amplifier 32 which in turn is determined by the ratio of resistances of resistor 29 to resistor 30.

As the input signal voltage V1 continues to increase beyond point F, as shown in FIG. 3, the output voltage V3 of operational amplifier 32 exceeds the voltage V4, shown in FIG. 2, thereby causing diode 40 to conduct. Conduction of diode 40 completes a negative feedback path composed of diode 40, rheostat 41 and potentiometer 35. This negative feedback path effectively places rheostat 41 and potentiometer 35 in parallel with resistor 29 causing a decrease in the gain of operational amplifier 32 and thus a decrease in the rate of increase of control current I3 thereby causing portion CD of the output curve as shown in FIG. 3.

Although the non-linear function generator has been primarily described in terms of a circuit for increasing the sensitivity of a meter in a particular voltage range, it will be apparent to those skilled in the art that the non-linear function generator described herein may be used for generating numerous non-linear functions and for numerous other purposes. For example, the meter 22 may be replaced by a resistor with the output signal voltage taken across this resistor and being used as a control signal in a control system. In the alternative, if a waveform inverted from that shown in FIG. 3 were desired, the output signal voltage may be taken across resistor 25 which is designated as V5 in FIG. 2. Also, a number of feedback paths corresponding to diode 40, rheostat 41, and potentiometer 35 could be used to provide a number of additional different slopes in the output signal. Also, wave shapes similar to that shown in FIG. 3 may be produced having slopes and discontinuity points varied considerably by adjustment of rheostats 34 and 41, and potentiometer 35.

In view of the above, it will be apparent that modifications and variations are possible within the scope and spirit of the above teachings. It is therefore to be understood that within the scope of the appended claims, the invention may be practiced other than as specifically described.

What is claimed as new and desired to be secured by Letters Patent of the United States is:

1. Apparatus for producing a non-linear electrical output signal from a linear electrical input signal comprising:
   first terminal means having first and second terminals for connecting said apparatus to a source of electrical power, said second terminal being connected to a common point;
   a load having first and second terminals;
   means for connecting said first terminal of said load to said first terminal of said first terminal means;
   a first circuit path having first and second ends;
   a second circuit path having first and second ends, said second ends of said first and second circuit paths being connected to said second terminal of said load, said first end of said second circuit path connected to said common point;
   second terminal means in the first circuit path for applying the linear electrical input signal to said first circuit path between the first end of said first circuit path and said common point;
   means connected to said first end of said second circuit path and responsive to the amplitude of the linear electrical input signal for varying the rate of change of current in the second circuit path to vary the rate of change of the output signal with respect to said linear electric input signal when said linear electric input signal exceeds a predetermined level.

2. Apparatus for producing a non-linear electrical output signal from a linear electrical input signal as recited in claim 1 wherein said means responsive to the amplitude of the linear electrical input signal comprises a differential amplifier having first and second inputs, and an output, and means for applying a bias voltage to said first input and means for applying the linear electrical input signal to said second input.

3. Apparatus for producing a non-linear electrical output signal in response to a linear electrical input signal as recited in claim 2 wherein said differential amplifier includes a feedback circuit, said feedback circuit including a reversely biased diode which becomes conductive to complete the feedback circuit upon the output signal of said differential amplifier exceeding a predetermined level.

4. Apparatus for producing a non-linear electrical output signal in response to a linear electrical input signal as recited in Claim 3 wherein said output of said differential amplifier is isolated from said second circuit path by a diode until said linear electrical input signal exceeds said predetermined level.

5. Apparatus for producing a non-linear electrical output signal in response to a linear electric input signal, comprising:
   means for connecting said apparatus to a direct current power supply including means for coupling one terminal of said power supply to a common point;
   a load having first and second terminals, said output signal being taken across said load, said first terminal of said load being connected to said connecting means;
   a first circuit path having an input and an output, means for connecting the linear electric input signal between said input of said first circuit path and a common point and said output of said first circuit path being connected to said second terminal of said load;
   a second circuit path having first and second ends, said first end being connected to said second terminal of said load and said second end being connected to said common point; and
   a differential amplifier circuit means for changing the rate of change of current in said second circuit path when the linear input signal exceeds a predetermined level so as to vary the amount of current drawn through the load by said second circuit path and thereby to vary the relationship between the output signal and the linear electrical input signal.

6. Apparatus for producing a non-linear electrical output signal in response to a linear electrical input signal as recited in claim 5 wherein said differential amplifier circuit means includes a feedback circuit, said feedback circuit including a reversely biased diode which becomes conductive to complete the feedback circuit upon the output signal of said differential amplifier exceeding a predetermined level.

7. Apparatus for producing a non-linear electrical output signal in response to a linear electrical input signal as recited in claim 6 wherein said output of said differential amplifier is isolated from said second circuit path by a diode until said linear electrical input signal exceeds said predetermined level.

8. Apparatus for producing a non-linear electrical output signal in response to a linear electrical input signal as recited in claim 7 wherein said load is a meter.

* * * * *